United States Patent
Hara

(10) Patent No.: US 11,132,658 B2
(45) Date of Patent: Sep. 28, 2021

(54) COMMODITY REGISTRATION APPARATUS AND METHOD

(71) Applicant: TOSHIBA TEC KABUSHIKI KAISHA, Tokyo (JP)

(72) Inventor: Noriyoshi Hara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 16/690,940

(22) Filed: Nov. 21, 2019

(65) Prior Publication Data
US 2020/0234265 A1    Jul. 23, 2020

(30) Foreign Application Priority Data
Jan. 17, 2019    (JP) .............................. JP2019-006209

(51) Int. Cl.
*G06Q 20/20*    (2012.01)
(52) U.S. Cl.
CPC ......... *G06Q 20/203* (2013.01); *G06Q 20/206* (2013.01); *G06Q 20/208* (2013.01)
(58) Field of Classification Search
CPC .. G06Q 20/203; G06Q 20/208; G06Q 20/206; G06Q 20/4014; G06Q 20/18;
(Continued)

(56) References Cited

U.S. PATENT DOCUMENTS

| 10,282,852 B1* | 5/2019 | Buibas | .................... G06T 7/277 |
| 2006/0032915 A1* | 2/2006 | Schwartz | .................. G07F 7/00 235/383 |

(Continued)

FOREIGN PATENT DOCUMENTS

| JP | 2016-126749 A | 7/2016 |
| JP | 2018-159965 A | 10/2018 |

OTHER PUBLICATIONS

B. Wu, W. Tseng, Y. Chen, S. Yao and P. Chang, "An intelligent self-checkout system for smart retail," 2016 International Conference on System Science and Engineering (ICSSE), Puli, 2016, pp. 1-4. (Year: 2016).*

(Continued)

*Primary Examiner* — Nathan A Mitchell
(74) *Attorney, Agent, or Firm* — Kim & Stewart LLP

(57) ABSTRACT

A commodity registration apparatus includes a check-in terminal, a sensor group, and a management terminal. A processor of the management terminal is configured to track movement of a shopper and store items using the sensor group. A first commodity list is updated to include a first item when the tracked movements indicate the known shopper has selected the first item for purchase. The movements of any unidentified shopper are tracked. The processor updates a second commodity list to include a second item when tracked movements indicate the unidentified shopper has selected the second item for purchase. The second commodity list is associated with a provisional identification code. Commodity registration data for settlement processing is generated using the first commodity list unless the unidentified shopper is later identified as the known shopper, in which case, commodity registration data is generated using the first and second commodity lists in combination.

18 Claims, 4 Drawing Sheets

(58) Field of Classification Search
CPC ............. G06Q 20/40145; G06Q 20/42; G07G 1/0018; G07G 1/01; G07G 1/06; H04N 7/18
See application file for complete search history.

(56) References Cited

U.S. PATENT DOCUMENTS

| | | | | |
|---|---|---|---|---|
| 2015/0006386 A1* | 1/2015 | Tebbe | ................ | G06Q 20/326 705/44 |
| 2015/0010204 A1* | 1/2015 | Iwai | ................ | G06K 9/00771 382/103 |
| 2015/0029339 A1* | 1/2015 | Kobres | ................ | H04N 7/181 348/150 |
| 2015/0039458 A1* | 2/2015 | Reid | ................ | G06K 9/00771 705/26.1 |
| 2016/0019514 A1* | 1/2016 | Landers, Jr. | ......... | G06Q 20/202 705/20 |
| 2017/0323376 A1* | 11/2017 | Glaser | ................ | G06Q 20/203 |
| 2018/0225672 A1 | 8/2018 | Taira et al. | | |
| 2018/0232796 A1* | 8/2018 | Glaser | .................... | G06Q 90/20 |
| 2019/0065881 A1* | 2/2019 | Zucker | ............... | G06K 9/00778 |
| 2019/0303676 A1* | 10/2019 | Costello | ............... | G07G 1/0009 |
| 2019/0362299 A1* | 11/2019 | Chan | .................. | G06K 19/0723 |
| 2020/0079412 A1* | 3/2020 | Ramanathan | ........ | G06Q 20/322 |
| 2020/0104594 A1* | 4/2020 | Zucker | ................ | G06K 9/3233 |
| 2020/0134701 A1* | 4/2020 | Zucker | ................... | G06Q 20/20 |
| 2020/0137047 A1* | 4/2020 | Zucker | ............... | G06K 9/00288 |
| 2020/0143172 A1* | 5/2020 | Zucker | ................. | G06K 7/1413 |
| 2020/0184230 A1* | 6/2020 | Liu | .................... | G06K 9/00342 |
| 2020/0193404 A1* | 6/2020 | Angenfelt | ............ | G07G 1/0081 |

OTHER PUBLICATIONS

K. Wankhede, B. Wukkadada and V. Nadar, "Just Walk-Out Technology and its Challenges: A Case of Amazon Go," 2018 International Conference on Inventive Research in Computing Applications (ICIRCA), Coimbatore, 2018, pp. 254-257. (Year: 2018).*

Ruiz et al. Autonomous Inventory Monitoring through Multi-Modal Sensing (AIM3S) for Cashier-Less Stores. In Proceedings of the 6th ACM International Conference on Systems for Energy-Efficient Buildings, Cities, and Transportation (BuildSys '19). Association for Computing Machinery, New York, NY, (Year: 2019).*

* cited by examiner

FIG. 4

```
                 PLEASE CONFIRM PURCHASED COMMODITIES
    CB1 ─☑   × × × × × × × × × ×        350 YEN  ─ ST1
    CB2 ─☑   × × × × × × × ×            198 YEN  ─ ST2
    CB3 ─☑   × × × ×                    100 YEN  ─ ST3
    CB4 ─☑   × × × × ×                  280 YEN  ─ ST4
    CB5 ─☑   × × × × × × × ×            680 YEN  ─ ST5
             TOTAL              FIVE  1,608 YEN  ─ ST6

[ DETERMINE ] ─ BU1
```
SC1

FIG. 5

```
                 PLEASE CONFIRM PURCHASED COMMODITIES
    CB1 ─☑   × × × × × × × × × ×        350 YEN  ─ ST1
    CB2 ─☑   × × × × × × × ×            198 YEN  ─ ST2
    CB3 ─☑   × × × ×                    100 YEN  ─ ST3
    CB4 ─☑   × × × × ×                  280 YEN  ─ ST4
    CB5 ─☑   × × × × × × × ×            680 YEN  ─ ST5
             TOTAL              FIVE  1,608 YEN  ─ ST6

ARE THESE PURCHASED COMMODITIES?
    CB6 ─☐   × × × × × × × ×            298 YEN  ─ ST7
    CB7 ─☐   × × × × ×                   98 YEN  ─ ST8

[ DETERMINE ] ─ BU1
```
SC2

COMMODITY REGISTRATION APPARATUS AND METHOD

CROSS-REFERENCE TO RELATED APPLICATION

This application is based upon and claims the benefit of priority from Japanese Patent Application No. 2019-006209, filed on Jan. 17, 2019, the entire contents of which are incorporated herein by reference.

FIELD

Embodiments described herein relate generally to commodity registration apparatus and method.

BACKGROUND

A technique of monitoring behavior of a shopper in a store using a large number of sensors for identifying commodities that the shopper is about to purchase is known.

However, according to such a technique, it is necessary to appropriately position and install a large number of sensors and then appropriately process detection results from these sensors to make it possible to continuously monitor the behavior of the shopper. There are a lot of practical difficulties associated with actual construction and operation of such a system.

It is desirable that registration of commodities to be purchased can be performed even for a shopper that could not or cannot be completely tracked from entry into the store until exit from the store.

DESCRIPTION OF THE DRAWINGS

FIG. 4 is a diagram illustrating a first confirmation screen.

FIG. 5 is a diagram illustrating a second confirmation screen.

DETAILED DESCRIPTION

An embodiment is directed to providing commodity registration apparatus and method that can perform sales registration of commodities for a shopper that was not tracked for an entire time period from entry into a store until exit from the store.

In general, according to an embodiment, a commodity registration apparatus includes a check-in terminal to obtain a customer identification code for a known shopper; a sensor group to detect movement of shoppers and items in a store space; and a management terminal connected to the check-in terminal and the sensor group by a network. The management terminal includes a processor configured to track movement of the known shopper based on output of the sensor group and track movement of items from a sales location based on output of the sensor group. The processor updates a first commodity list to include a commodity code for a first item when the tracked movements of the known shopper and the first item indicate the known shopper has selected the first item for purchase. The first commodity list is associated with the customer identification code of the known shopper. The processor also tracks movement of any unidentified shopper based on output of the sensor group. An unidentified shopper is a customer not presently associated with a customer identification code. The processor updates a second commodity list to include a commodity code for a second item when tracked movements of the unidentified shopper and the second item indicate the unidentified shopper has selected the second item for purchase. The second commodity list is associated with a provisional identification code generated for the unidentified shopper. The processor generates commodity registration data for settlement processing for the known shopper using the first commodity list unless the unidentified shopper is identified as the known shopper prior to settlement processing, in which case, commodity registration data for settlement processing is generated using the first and second commodity lists in combination.

An example embodiment is described below with reference to the drawings. In the following embodiment, a sales management apparatus having a function of a commodity registration apparatus is described.

Figure 1:
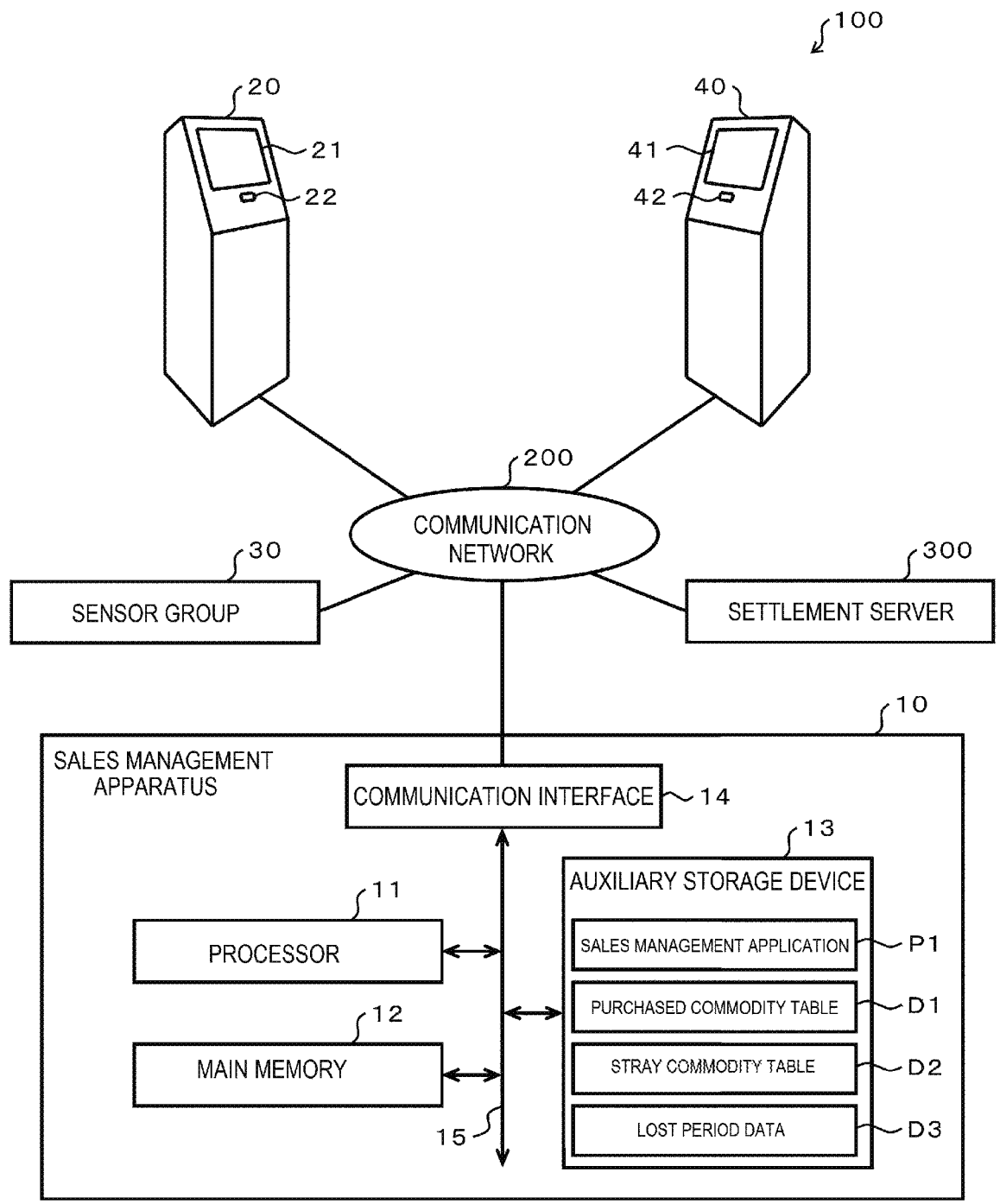
FIG. 1 is a block diagram illustrating a configuration of a store system including a sales management apparatus.

FIG. 1 is a block diagram illustrating a configuration of a store system 100 including a sales management apparatus 10 according to the present embodiment.

The store system 100, which may be referred to as a commodity registration system or apparatus, performs information processing for commodity sales in a store that sells commodities displayed in a selling space (e.g., a sales floor). The store system 100 is configured by communicably connecting the sales management apparatus 10, a check-in terminal 20, a sensor group 30, and a check-out terminal 40 via a communication network 200. The store system 100 may include a plurality of check-in terminals 20. The store system 100 may include a plurality of check-out terminals 40. The sales management apparatus 10 is capable of communicating with a settlement server 300 as well via the communication network 200.

The communication network 200 can use the Internet, a VPN (virtual private network), a LAN (local area network), a public communication network, and a mobile communication network independently or in combination as appropriate.

The settlement server 300 performs credit settlement according to a settlement request received via the communication network 200.

The sales management apparatus 10 registers commodities taken out from the selling space of the store by a shopper as the purchased commodities of the shopper. For example, if the shopper exits the store, the sales management apparatus 10 requests the settlement server 300 to settle a price for the purchased commodities of the shopper.

The check-in terminal 20 performs a process for the shopper to start shopping at the store. The check-in terminal 20 includes a touch panel 21 and a reader 22. The touch panel 21 displays a screen for presenting various kinds of information to the shopper who is going to enter the store. The touch panel 21 receives data designated by touch operation(s) by the shopper. The reader 22 reads a member code presented by the shopper who is going to enter the store. The reader 22 is, for example, an optical two-dimensional barcode reader.

The sensor group 30 includes a large number of sensors disposed in the store. The sensors detect the behavior of the shopper and a display state of commodities. The sensors are, for example, a camera, an optical sensor, an infrared sensor, a temperature sensor, and/or a weight sensor.

The check-out terminal 40 performs a process for the shopper to exit the store. The check-out terminal 40 includes a touch panel 41 and a reader 42. The touch panel displays a screen for presenting various kinds of information to the shopper who is going to exit the store. The touch panel 41 inputs data designated by touch operation by the shopper. The reader 42 reads a member code presented by the shopper who is going to exit the store. The reader is, for example, an optical two-dimensional barcode reader.

The sales management apparatus 10 includes a processor 11, a main memory 12, an auxiliary storage device 13, a communication interface 14, and a transmission line 15. The processor 11, the main memory 12, the auxiliary storage device 13, and the communication interface 14 are connected by the transmission line 15. The processor 11, the main memory 12, and the auxiliary storage device 13 are connected by the transmission line 15 to configure a computer that performs information processing for controlling the sales management apparatus 10.

The processor 11 is equivalent to a central functional unit of the computer, for example, a central processing unit (CPU). The processor 11 performs, according to an information processing program, information processing for realizing various functions of the sales management apparatus 10.

The main memory 12 is equivalent to a main storage or the like of the computer. The main memory 12 includes a nonvolatile memory region and a volatile memory region. The main memory 12 stores an information processing program in the nonvolatile memory region. The main memory 12 may store, in the nonvolatile or volatile memory region, data necessary for the processor 11 to execute the information processing. The main memory 12 uses the volatile memory region as a work area where data is rewritten as appropriate by the processor 11.

The auxiliary storage device 13 is equivalent to auxiliary storage of the computer. As the auxiliary storage device 13, for example, an EEPROM (electric erasable programmable read-only memory), an HDD (hard disc drive), or an SSD (solid state drive) can be used independently or a plurality of the EEPROMs, the HDDs, or the SSDs can be used in combination. The auxiliary storage device 13 saves data used by the processor 11 in performing various kinds of processing and data generated by the processing in the processor 11. The auxiliary storage device 13 may store information processing programs. One of the information processing programs stored by the auxiliary storage device 13 is an application program (hereinafter referred to as sales management application) P1 for performing a function of the sales management apparatus 10. The auxiliary storage device 13 stores a purchased commodity table D1, a stray commodity table D2, and lost period data D3. The purchased commodity table D1 is table data representing a list of purchased commodities of a shopper in association with a member code of the shopper. The stray commodity table D2 is table data representing a list of commodities that have been taken from the selling space but for which it is unknown which shopper is intending going to purchase (hereinafter referred to as stray commodities). The stray commodity list includes for each of the stray commodities, a commodity code for identifying the stray commodity and time when the stray commodity was taken from the selling space. The lost period data D3 is explained below.

The communication interface 14 is an interface for data communication via the communication network 200. As the communication interface 14, for example, a well-known communication device for performing data communication via a LAN can be used.

The transmission line 15 includes an address bus, a data bus, and a control signal line and transmits data and control signals between the connected sections.

In the sales management apparatus 10, for example, a general-purpose computer can be used as basic hardware. In this case, typically, a computer apparatus, in which the sales management application P1 has not been pre-stored in the auxiliary storage device 13 will be utilized, and the sales management application P1 will later be individually provided to a company or the like that operates the sales management apparatus 10. The sales management application P1 can be recorded in a removable recording medium such as a magnetic disk, a magneto-optical disk, an optical disk, or a semiconductor memory or being downloaded via a network. In this case, the sales management application P1 will be written in the auxiliary storage device 13 by an administrator, a serviceperson, or the like of the sales management apparatus 10. However, the sales management apparatus 10, in which the sales management application P1 is stored in the auxiliary storage device 13 of the computer apparatus, may be provided to the above-described company or the like.

The operation of the store system 100 is now described.

A shopper shopping in the store using the store system 100 finishes member registration before entering the store and receives a member code. In the member registration, the shopper provides credit card information or the like (referred to as credit information) for credit settlement of sales transactions at the store. The member code and the credit information of the shopper are saved in the auxiliary storage device 13 or another storage device in association with each other. The other storage device is, for example, a storage device included in a server apparatus or the like connected to the communication network 200.

The shopper, who enters the store and starts shopping, holds a barcode representing the member code over the reader 22 of the check-in terminal 20. For example, the shopper causes a display screen of a smartphone or the like carried by the shopper to display the barcode representing the member code and then holds the barcode over the reader 22. The reader 22 reads the barcode and acquires the member code shown in the barcode. Well-known processing for preventing illegal acts by falsification is desirably applied to the barcode. It is assumed in this example that a two-dimensional code is used as the barcode. However, a one-dimensional code or, in general, a barcode of any type can be used. The member code may be formed on a member card. The reader 22 may acquire the member code through noncontact communication, contact communication, magnet reading, or manual input by the shopper. Similarly, the reader 22 may read the face, the fingerprint, or the like of the shopper, to authenticate the shopper using a biological authentication technique such as facial authentication or fingerprint authentication, and then read the member code stored in the auxiliary storage device 13 or any other storage device accordingly.

If a member code is acquired by the reader 22, the check-in terminal 20 requests a start of sales management for the shopper. For example, a processor included in the check-in terminal 20 delivers data for the requested start of the sales management to the communication network 200 while addressing the data to the sales management apparatus 10. The processor includes the member code acquired by the reader 22 and a predetermined command to represent the request for the start of the sales management. The data is transmitted to the sales management apparatus 10 by the communication network 200. In the sales management apparatus 10, the communication interface 14 receives the data transmitted by the communication network 200 and gives the data to the processor 11. Then, the processor 11 executes, according to the sales management application P1, information processing for the sales management (hereinafter referred to as main management processing) as further explained below.

Figure 2:
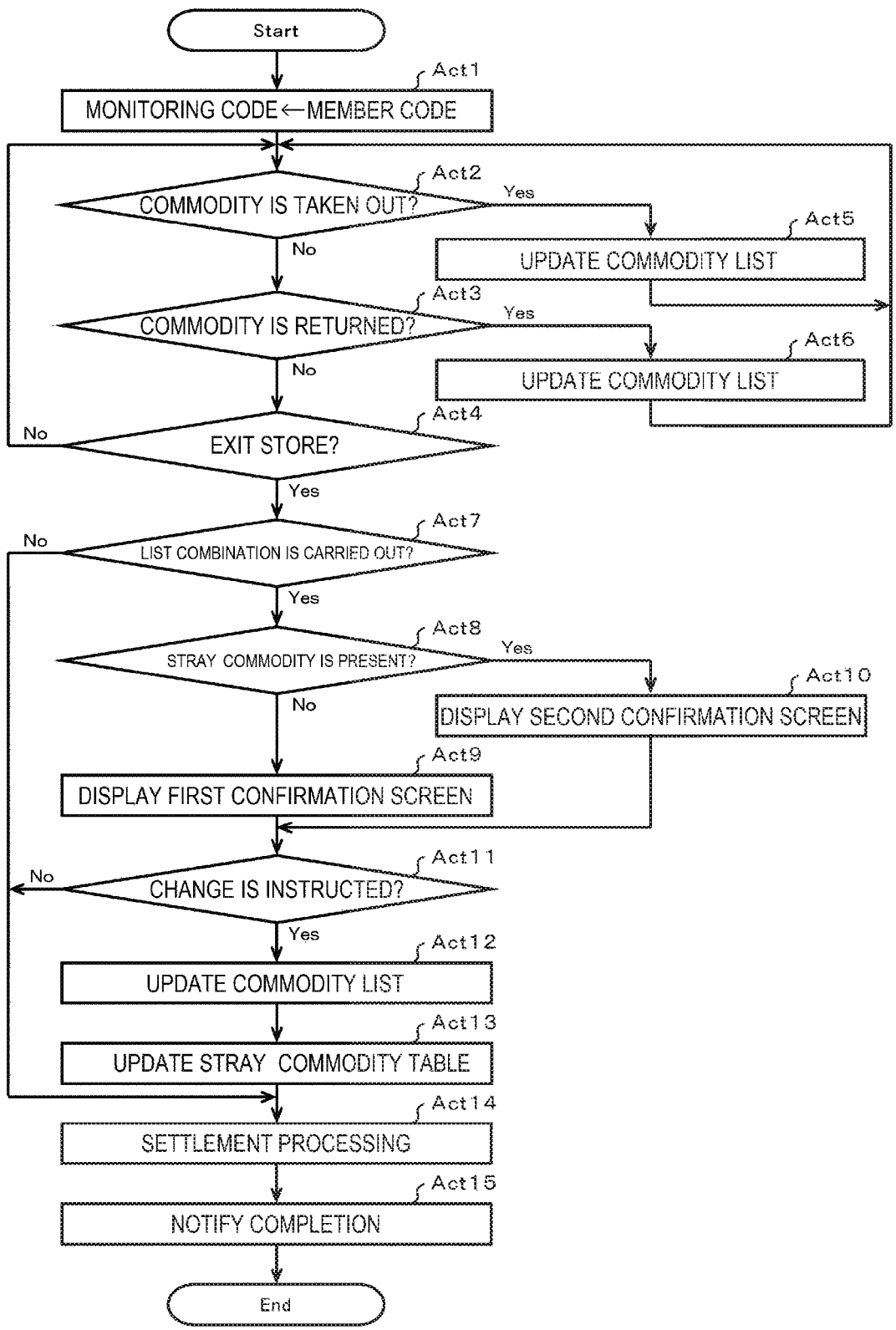
FIG. 2 is a flowchart of main management processing by a processor illustrated in FIG. 1.

FIG. 2 is a flowchart of main management processing by the processor 11. If a plurality of shoppers are present in the store, the processor 11 executes the main management processing in parallel for each of the respective shoppers. A plurality of processors may be included in the sales management apparatus 10 to perform distributed processing of a plurality of main management processing using the plurality of processors. Alternatively, a plurality of sales management apparatuses 10 may be provided to perform distributed processing of the plurality of main management processing using the plurality of sales management apparatuses 10. Content of the main management processing described below is an example. A change of the order of a part of the processing, omission of a part of the processing, addition of other processing, or the like can be performed as appropriate.

In Act 1, the processor 11 sets, as a monitoring code, the member code. That is, the processor 11 uses the member code as a customer code for identifying the shopper that has entered the store. The processor 11 executes the sales management application P1 and the computer including the processor 11 functions as a first acquiring section. As the customer code, any code may be used so long as the code is capable of identifying an individual shopper. For example, a code like a serial number determined independently of the member registration may be used as the customer code.

The main management processing is processing for managing shopping by one shopper whose identity has been specified. In the following explanation a particular shopper for whom the management is being performed is referred to as a specific customer.

The processor 11 executes, separately from the main management processing, information processing (hereinafter referred to as monitoring processing) for monitoring behavior of the shopper and a display state of commodities based on detection results from the sensor group 30. For example, during the monitoring processing, first, the processor 11 identifies a shopper that has been photographed when the shopper was facing the check-in terminal 20 by a camera in the sensor group 30. The processor 11 monitors, as behavior concerning the shopper identified by the monitoring code set by the main management processing as described above or a monitoring code set by sub-management processing described below, movements of the shopper, a motion of the shopper taking out a commodity from the selling space, a motion of the shopper returning a commodity to the selling space, and the like. The processor 11 monitors a state of commodities in the selling space based on detection results by the camera and the other sensors included in the sensor group 30 and, if, for example, a commodity is taken from a selling space or a commodity is returned to a selling space, determines the taking-out of the commodity or the return of the commodity, or the like, has occurred. Any applicable information processing may be performed to carry out the monitoring processing. For example, an existing technique can be used. If a plurality of monitoring codes are set, the processor 11 executes the monitoring processing concerning each of the plurality of monitoring codes. However, a plurality of processors may be included in the sales management apparatus 10 to perform distributed processing of the monitoring processing using the plurality of processors. Alternatively, a plurality of sales management apparatuses 10 may be provided to perform distributed processing of the monitoring processing using the plurality of sales management apparatuses 10. In this way, the sales management apparatus 10 also has a function of a monitoring apparatus that monitors behavior of the shopper. However, the monitoring processing may be executed by an information processing apparatus different from the sales management apparatus 10.

During the main management processing, in Act 2, the processor 11 determines whether the specific customer takes out a purchase target commodity from the selling space. If the relevant behavior performed by the specific customer is not recognized through the monitoring processing, the processor 11 determines No and the process proceeds to Act 3.

In Act 3, the processor 11 determines whether the specific customer returns a commodity to the selling space. If the relevant behavior performed by the specific customer is not recognized through the monitoring processing, the processor 11 determines No and the process proceeds to Act 4.

In Act 4, the processor 11 determines whether the specific customer is about to exit the store. If the relevant behavior performed by the specific customer is not recognized through the monitoring processing, the processor 11 determines No and the process returns to Act 2.

In this way, in Act 2 to Act 4, the processor 11 waits for taking-out of a commodity, return of a commodity, and exit from the store to be recognized through the monitoring processing.

If recognizing during the monitoring processing that the specific customer takes out a commodity from the selling space, the processor 11 interrupts the main management processing concerning the specific customer and notifies a commodity code of the commodity taken out by the specific customer. If the main management processing is interrupted, the processor 11 determines Yes in Act 2 of the main management processing and the process proceeds to Act 5.

In Act 5, the processor 11 updates a commodity list (e.g., non-provisional commodity registration data) shown in association with a member code of the specific customer in the purchased commodity table D1. That is, the processor 11 updates the relevant commodity list to include, as a commodity code of a purchased commodity, the commodity code notified from the monitoring processing. Consequently, registration of the purchased commodity is performed in association with the member code serving as the customer code acquired by a function of the first acquiring section of the processor 11. The processor 11 executes the information processing based on the sales management application P1 in this way, whereby the computer including the processor 11 as the central part functions as a registering section that performs such registration. Thereafter, the processor 11 returns to the waiting state in Act 2 to Act 4.

If recognizing during the monitoring processing that the specific customer returns a commodity to the selling space, the processor 11 interrupts the main management processing concerning the specific customer and notifies a commodity code of the commodity returned by the specific customer. If the main management processing is interrupted, the processor 11 determines Yes in Act 3 of the main management processing and the process proceeds to Act 6.

In Act 6, the processor 11 updates the commodity list shown in association with the specific customer in the purchased commodity table D1. That is, the processor 11 updates the relevant commodity list to exclude the commodity code notified from the monitoring processing from commodity code of purchased commodities. Thereafter, the processor 11 returns to the waiting state in Act 2 to Act 4.

During the monitoring processing, for example, it is possible that a personal characteristic, such as clothes worn by the shopper when entering the store may change and the shopper photographed by the camera must be identified based on similarity to the previously obtained personal characteristic. For example, if the shopper's clothes are greatly changed because, for example, the shopper takes off a coat, the shopper being photographed by the camera may no longer be correctly identified. In such a situation, the interruption to the main management processing concerning the relevant shopper is not performed. The processor 11 maintains the waiting state in Act 2 to Act 4.

On the other hand, in the situation described above, during the monitoring processing, any shopper whose monitoring code is unknown may be detected anew. In this case, the processor 11 executes, on the shopper, information processing described below (hereinafter referred to as sub-management processing) according to the sales management application P1.

Figure 3:
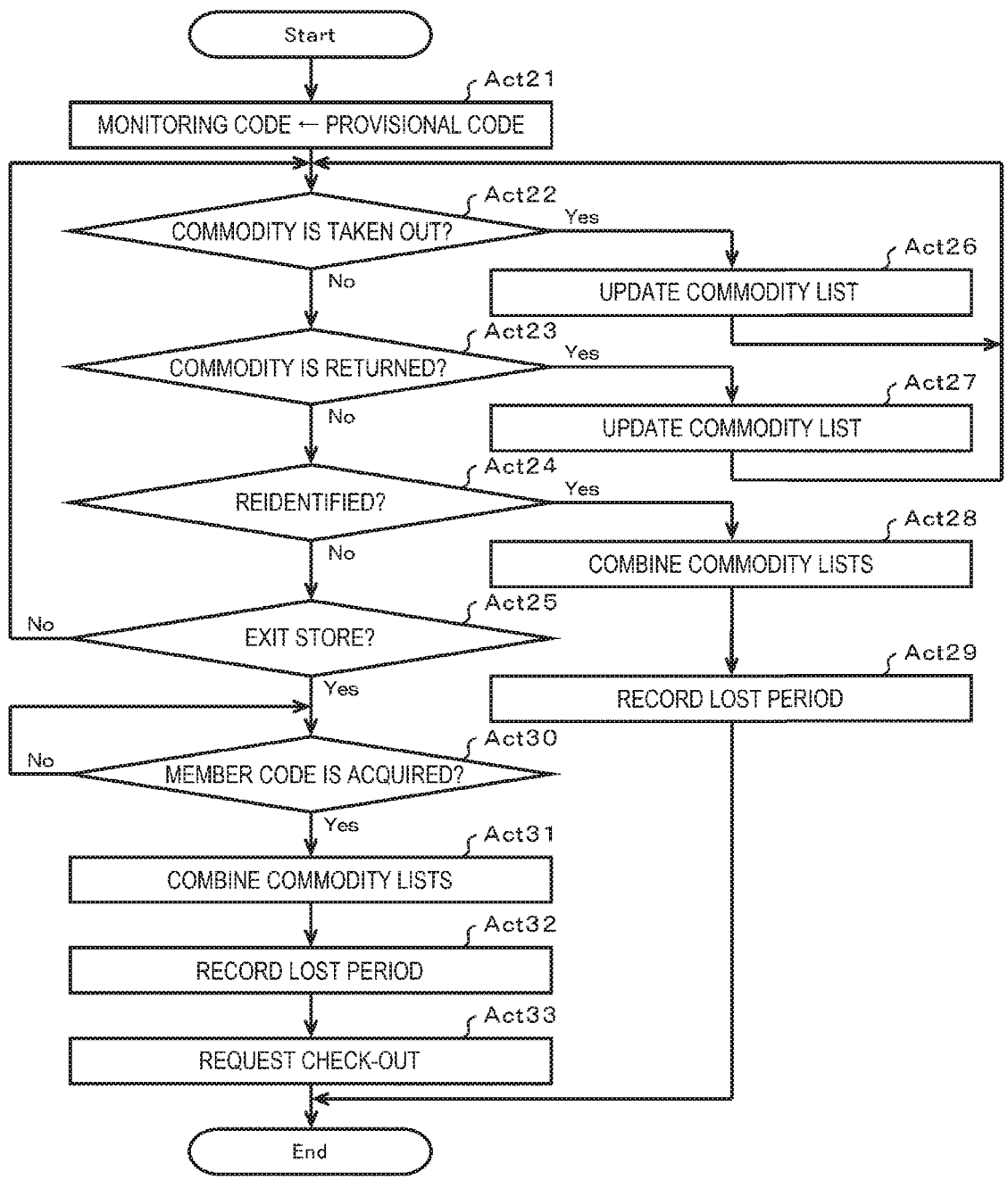
FIG. 3 is a flowchart of sub-management processing by the processor.

FIG. 3 is a flowchart of the sub-management processing by the processor 11. In this way, the sub-management processing is processing for managing shopping by a shopper whose identity is not presently specified. In the following explanation concerning the sub-management processing, such a shopper to be managed is referred to as an unidentified customer. If unidentified customers are present in the store, the processor 11 executes the sub-management processing on the respective unidentified customers in parallel. A plurality of processors may be included in the sales management apparatus 10 to perform distributed processing of a plurality of kinds of sub-management processing using the plurality of processors. Alternatively, a plurality of sales management apparatuses 10 may be provided to perform distributed processing of the plurality of kinds of sub-management processing using the plurality of sales management apparatuses 10. Content of the sub-management processing described below is an example. A change of the order of a part of the processing, omission of a part of the processing, addition of other processing, or the like can be performed as appropriate.

In Act 21, the processor 11 determines a provisional code that coincides with no member code and is different from an already used provisional code. The processor 11 sets the determined provisional code as a new monitoring code concerning the shopper whose monitoring code is unidentified during the monitoring processing as described above, that is, the unidentified customer. On the other hand, during the monitoring processing, as described above, the processor 11 monitors behavior of the unidentified customer as behavior of the shopper identified by a monitoring code set anew. The processor 11 executes the information processing based on the sales management application P1 in this way, whereby the computer including the processor 11 functions as a determining section that determines a provisional code.

In Act 22, the processor 11 determines whether the unidentified customer takes out a commodity from the selling space. If the relevant behavior performed by the unknown customer is not recognized through the monitoring processing, the processor 11 determines No and the process proceeds to Act 23.

In Act 23, the processor 11 determines whether the unidentified customer returns a commodity to the selling space. If the relevant behavior performed by the unidentified customer is not recognized through the monitoring processing, the processor 11 determines No and the process proceeds to Act 24.

In Act 24, the processor 11 determines whether the original monitoring code before the setting of the monitoring code in Act 21 concerning the unidentified customer is reidentified during the monitoring processing. If the unidentified monitoring code is not reidentified, the processor 11 determines No and the process proceeds to Act 25.

In Act 25, the processor 11 determines whether the unidentified customer is going to exit the store. If the relevant behavior taken by the unidentified customer is not recognized through the monitoring processing, the processor 11 determines No and the process returns to Act 22.

In this way, in Act 22 to Act 25, the processor 11 waits for taking-out of a commodity, return of a commodity, reidentification of a monitoring code, and exit from the store to be recognized through the monitoring processing.

During the monitoring processing, if recognizing that the unidentified customer takes out a commodity from the selling space, the processor 11 interrupts the sub-management processing concerning the unidentified customer and notifies a commodity code of the commodity taken out by the unidentified customer. If the sub-management processing is interrupted, the processor 11 determines Yes in Act 22 of the sub-management processing and the process proceeds to Act 26.

In Act 26, the processor 11 updates a commodity list (e.g., provisional commodity registration data) shown in association with the unidentified customer in the purchased commodity table D1. That is, the processor 11 updates a commodity list associated with the provisional code determined for the relevant unidentified customer to include, as a commodity code of a purchased commodity, a commodity code notified from the monitoring processing. Consequently, the purchased commodity is registered in association with the provisional code determined by a function of the processor 11 functioning as the determining section. The processor 11 executes the information processing based on the sales management application P1 in this way, whereby the computer including the processor 11 as the central part functions as a registering section that performs such registration. Thereafter, the processor 11 returns to the waiting state in Act 22 to Act 25.

During the monitoring processing, if recognizing that the unidentified customer returns a commodity to the selling space, the processor 11 interrupts the sub-management processing concerning the unidentified customer and notifies a commodity code of the commodity returned by the unidentified customer. If the sub-management processing is interrupted, the processor 11 determines Yes in Act 23 of the sub-management processing and the process proceeds to Act 27.

In Act 27, the processor 11 updates a commodity list shown in association with the unidentified customer in the purchased commodity table D1. That is, the processor 11 updates the relevant commodity list to exclude the commodity code notified from the monitoring processing from commodity codes of purchased commodities. Thereafter, the processor 11 returns to the waiting state in Act 22 to Act 25.

Since, for example, the shopper may put a coat back on after it has been taken off or the face of the shopper may be clearly photographed again, the unidentified customer may be reidentified (re-associated with the monitoring code set in Act 1). In this case, during the monitoring processing, the processor 11 interrupts the sub-management processing concerning the unidentified customer and notifies the reidentified monitoring code. If the sub-management processing is interrupted, the processor 11 determines Yes in Act 24 of the sub-management processing and the process proceeds to Act 28.

In Act 28, the processor 11 combines the commodity list for the unidentified customer with the commodity list for the specific customer identified by the monitoring code notified as described above. That is, the processor 11 adds each of the purchased commodities shown in the commodity list for the unidentified customer to the commodity list for the specific customer identified by the monitoring code notified as described above. The reidentification is equivalent to, identification of the member code acquired as the customer code for the shopper when the shopper enters the store after a provisional code was set. In this case, the processor 11 updates purchased commodities associated with the provisional code determined for the shopper to purchased commodities associated with the member code acquired as the customer code for the shopper. The processor 11 executes the information processing based on the sales management application in this way, whereby the computer including the processor 11 as the central part functions as an updating section that performs such update. At this time, the processor 11 may delete the commodity list for the unidentified customer from the purchased commodity table D1.

In Act 29, the processor 11 records a lost period for the specific customer identified by the monitoring code notified as described above. The lost period is a period from when, concerning a certain shopper, behavior of the specific customer becomes unknown until when behavior of the shopper is detected as behavior of the unidentified customer. For example, the processor 11 sets, as the lost period, a period from when the commodity list for the specific customer identified by the monitoring code notified as described above is updated last until when the monitoring code is set for the unidentified customer in Act 21. The processor 11 stores data representing the lost period in the main memory 12 or the auxiliary storage device 13 in association with the monitoring code of the specific customer. Thereafter, the processor 11 ends the sub-management processing.

On the other hand, if the unidentified customer performs predetermined behavior leading to exit from the store, the processor 11 detects with the monitoring processing that the unidentified customer is going to exit the store. For example, the inside of the store is laid out such that a shopper moving to the exit of the store passes in front of the check-out terminal 40. For example, if the unidentified customer moves close to the check-out terminal 40, the processor 11 detects that the unidentified customer is going to exit the store. During the monitoring processing, the processor 11 interrupts the sub-management processing concerning the unidentified customer and notifies that the unidentified customer is going to exit the store. If the sub-management processing is interrupted, the processor 11 determines Yes in Act 25 of the sub-management processing and the process proceeds to Act 30.

In Act 30, the processor 11 waits for a member code to be acquired in the check-out terminal 40. At this time, for example, the processor 11 requests the check-out terminal 40, which the unidentified customer approaches, to acquire a member code. In response to the request, for example, the check-out terminal 40 causes the touch panel 41 to display a guidance screen having content for urging the shopper to hold the member code over the reader 42. For example, the check-out terminal 40 drives a sound device incorporated in the check-out terminal 40, although not illustrated in FIG. 1, to generate call sound.

According to guidance on the guidance screen displayed on the touch panel 41, the shopper holds, over the reader 42, the same barcode as the barcode held over the reader 22 of the check-in terminal 20 when the shopper enters the store. The reader 42 reads the barcode held over the reader and acquires the member code shown on the barcode. Therefore, the reader 42 is a device that reads a barcode like the reader 22.

If the member code is read by the reader 42, the check-out terminal 40 notifies the member code to the sales management apparatus 10 as a response to the request. For example, a processor included in the check-out terminal 40 delivers notification data for the notification to the communication network 200 while addressing the notification data to the sales management apparatus 10. The processor includes, in the notification data, for example, the member code read by the reader 42 and a command decided in advance to represent the response to the request. The notification data is transmitted to the sales management apparatus 10 by the communication network 200. In the sales management apparatus 10, the communication interface 14 receives the notification data transmitted by the communication network 200 and gives the notification data to the processor 11. Then, the processor 11 determines Yes in Act 30 and the process proceeds to Act 31.

At this time, the processor 11 acquires, from the notification data, the member code serving as the customer code of the shopper going to exit the store. The processor 11 executes the information processing based on the sales management application P1 in this way, whereby the computer including the processor 11 as the central part functions as a second acquiring section.

In Act 31, the processor 11 combines the commodity list for the unidentified customer with the commodity list for the specific customer identified by the monitoring code coinciding with the member code notified as described above. Specific processing at this time may be the same as Act 28.

In Act 32, the processor 11 records the lost period for the specific customer identified by the monitoring code coinciding with the member code notified as described above. Specific processing at this time may be the same as Act 29.

In Act 33, the processor 11 interrupts the main management processing concerning the specific customer identified by the monitoring code coinciding with the member code notified as described above and requests check-out. Thereafter, the processor 11 ends the sub-management processing.

After the monitoring code set in Act 21 of the main management processing for the shopper, who is the unidentified customer, as described above is reidentified, during the monitoring processing, behavior of the shopper is detected as behavior of the specific customer. Therefore, during the main management processing, the process proceeds from the waiting state in Act 2 to Act 4 to processing corresponding to a detection result of behavior during the monitoring processing. Consequently, if the specific customer takes out a commodity or returns a commodity, the update of the commodity list described above corresponding to the taking-out or the return of the commodity is performed. The commodity list to be updated is the commodity list after the combination in Act 28 of the sub-management processing.

If it is detected by the monitoring processing that the specific customer is going to exit the store and the main management processing is notified to that effect, the processor 11 determines Yes in Act 4 and the process proceeds to Act 7. If the check-out request is performed from the sub-management processing as described above, the processor 11 also determines Yes in Act 4 as the specific customer is going to exit the store and the process proceeds to Act 7.

In Act 7, the processor 11 determines whether the combination in Act 28 of the sub-management processing is carried out concerning the commodity list for the specific customer. If the combination is carried out, the processor 11 determines Yes and the process proceeds to Act 8.

In Act 8, the processor 11 determines whether any stray commodity is recognized during the lost period for the specific customer. Concerning the taking-out of the commodity detected during the monitoring processing, if a monitoring code of the shopper who performs the taking-out of the commodity cannot be specified, the processor 11 adds a commodity code of the commodity to the stray commodity table D2 in association with time when the taking-out is detected. In Act 8 of the main management processing, for example, if the lost period associated with the specific customer is saved in the main memory 12 or the auxiliary storage device 13, the processor 11 determines whether an stray commodity associated with time in the lost period is present. If the relevant stray commodity is absent, the processor 11 determines No in Act 8. If the lost period associated with the specific customer is not saved in the main memory 12 or the auxiliary storage device 13, the processor 11 also determines No in Act 8. If determining No in Act 8, the process proceeds to Act 9.

In Act 9, the processor 11 requests the check-out terminal 40 to display a first confirmation screen. The first confirmation screen is a screen for confirming with the specific customer that the purchased commodities registered in the commodity list are correct commodities to be purchased by the specific customer.

FIG. 4 is a diagram illustrating a first confirmation screen SC1. The first confirmation screen SC1 illustrated in FIG. 4 is an example of a screen displayed if five commodities are registered in a commodity list as purchased commodity of the specific customer. However, in FIG. 4, characters forming character strings representing commodity names of the purchased commodities are omitted.

The first confirmation screen SC1 includes character strings ST1 to ST6, checkboxes CB1 to CB5, and a button BU1. The character strings ST1 to ST5 respectively correspond to the five commodities. The character strings ST1 to ST5 represent names and unit prices of the commodities corresponding thereto. The character string ST6 represents a total number and a total amount for the purchased commodities. The checkboxes CB1 to CB5 respectively correspond to the five commodities and are arranged besides the character strings corresponding to the commodities. All the checkboxes CB1 to CB5 include checkmarks and represent that the commodities corresponding thereto are set as the purchased commodities. The checkboxes CB1 to CB5 can selectively take two states of a state including the checkmarks and a state not including the checkmarks. The checkboxes CB1 to CB5 are GUI (graphical user interface) elements for a shopper to designate whether the commodities corresponding thereto are set as the purchased commodities. The button BU1 is a GUI element that the shopper should operate to declare that the confirmation is completed.

The processor 11 generates, based on the commodity list of the specific customer, screen data representing a screen like the first confirmation screen SC1 and transmits the screen data to the check-out terminal 40. The processor 11 also includes the following control data in the screen data. One of the control data causes, according to operation of the checkboxes CB1 to CB5, the check-out terminal 40 to perform processing for changing whether the commodities corresponding thereto are set as the purchased commodities and changing display/non-display of the checkmarks to represent the setting. One of the control data causes, according to operation of the button BU1, the check-out terminal 40 to perform notification of a setting state by the checkboxes CB1 to CB5 to the sales management apparatus 10. The screen data may be data directly representing an actual screen like a JPEG (joint photographic coding experts group) format or may be data for configuring a screen in the check-out terminal 40 like an HTML (hypertext markup language) format.

If receiving the screen data, the check-out terminal 40 displays the first configuration screen on the touch panel 41 based on the screen data. The check-out terminal 40 drives, for example, a sound device incorporated in the check-out terminal 40, although not illustrated in FIG. 1, to generate call sound.

The shopper confirms, based on the first confirmation screen displayed on the touch panel 41, that the purchased commodities are correctly registered. If a wrong commodity is set as a purchased commodity, the shopper operates a checkbox corresponding to the commodity not to set the commodity as a purchased commodity. If finishing the confirmation and necessary setting, the shopper operates the button BU1. In response to these kinds of operations, the check-out terminal 40 performs a change and notification of the setting according to the control data included in the screen data.

On the other hand, if a stray commodity associated with time in the lost period is present, the processor 11 determines Yes in Act 8 and the process proceeds to Act 10.

In Act 10, the processor 11 requests the check-out terminal 40 to display a second confirmation screen. The second confirmation screen is a screen for causing the specific customer to confirm that the purchased commodities registered in the commodity list are correct commodities to be purchased by the specific customer. The second confirmation screen is a screen for inquiring the shopper whether a stray commodity associated with time in the lost period is a commodity to be purchased by the specific customer or not. However, the second confirmation screen may be a screen showing a stray commodity associated with time in a period obtained by adding a predetermined margin to the lost period. Alternatively, the second confirmation screen may be a screen showing all stray commodities irrespective of the associated time. Alternatively, the second confirmation screen may be a screen showing stray commodities narrowed down according to a predetermined condition other than the time. For example, the second confirmation screen may not show a stray commodity taken out in a position where the shopper cannot be present in the lost period.

FIG. 5 is a diagram illustrating a second confirmation screen SC2. The second confirmation screen SC2 illustrated in FIG. 5 is an example of a screen displayed if the commodity list for the specific customer is the same as the commodity list referred to for the generation of the first confirmation screen SC1 illustrated in FIG. 4 and if two stray commodities are present. Therefore, the second confirmation screen SC2 is a screen in which an image including character strings ST7 and ST8 and checkboxes CB6 and CB7 is added to the first confirmation screen SC1. In FIG. 5, the same elements as the elements illustrated in FIG. 4 are denoted by the same reference signs. In FIG. 5, as in FIG. 4, characters forming character strings representing commodity names of purchased commodities are omitted.

The character strings ST7 and ST8 respectively correspond to the two stray commodities. The character strings ST7 and ST8 represent names and unit prices of the stray commodities corresponding thereto. The checkboxes CB6 and CB7 respectively correspond to the two stray commodities and are arranged besides the character strings corresponding to the stray commodities. Both of the checkboxes CB6 and CB7 do not include checkmarks to represent that the commodities corresponding thereto are not set as the purchased commodities. The checkboxes CB6 and CB7 can selectively take two states of a state including the checkmarks and a state not including the checkmarks. The checkboxes CB6 and CB7 are GUI elements for the shopper to designate whether the stray commodities corresponding thereto are set as the purchased commodities.

The processor 11 generates screen data representing a screen like the second confirmation screen SC2 and transmits the screen data to the check-out terminal 40. The processor 11 also includes the following control data in the screen data. One of the control data causes, according to operation of the checkboxes CB1 to CB7, the check-out terminal 40 to perform processing for changing whether the commodities corresponding thereto are set as the purchased commodities and changing display/non-display of the checkmarks to represent the setting. One of the control data causes, according to operation of the button BU1, the check-out terminal 40 to perform notification of a setting state by the checkboxes CB1 to CB7 to the sales management apparatus 10.

As described above, both of the first and second confirmation screens are screens for causing the shopper to confirm the purchased commodities associated with the member code serving as the customer code. The screen data representing the screen is equivalent to data for causing the shopper to perform the confirmation described above. That is, the transmission of the screen data to the check-out terminal 40 is equivalent to output of the data for the shopper to confirm the purchased commodities. The processor 11 executes the information processing based on the sales management application P1 in this way, whereby the computer including the processor 11 as the central part functions as an output section that performs the output described above. The screen data of the second confirmation screen is equivalent to data for causing the shopper to confirm that commodities unknown about by which shopper the commodities are taken out from the selling space are not purchased commodities. In this way, the computer including the processor 11 as the central part functions as an output section that outputs such data.

If receiving the screen data, the check-out terminal 40 displays the second confirmation screen on the touch panel 41 based on the screen data. The check-out terminal 40 drives, for example, the sound device incorporated in the check-out terminal 40, although not illustrated in FIG. 1, to generate call sound.

The shopper confirms, based on the second confirmation screen displayed on the touch panel 41, that the purchased commodities are correctly registered. If a wrong commodity is set as a purchased commodity, the shopper operates a checkbox corresponding to the commodity not to set the commodity as the purchased commodity. The shopper confirms, based on the second confirmation screen, that a stray commodity is a purchased commodity. If the stray commodity is not set as the purchased commodity although the stray commodity is the purchased commodity, the shopper operates a checkbox corresponding to the stray commodity to set the stray commodity as the purchased commodity. If finishing the confirmation and necessary setting, the shopper operates the button BU1. In response to these kinds of operation, the check-out terminal 40 performs a change and notification of setting according to the control data included in the screen data.

If ending Act 9 and Act 10, the process proceeds to Act 11.

In Act 11, the processor 11 determines, based on the notification of the check-out terminal 40 described above, whether a change of the purchased commodities is instructed. If the change is instructed, the processor 11 determines Yes and the process proceeds to Act 12.

In Act 12, the processor 11 updates the commodity list for the specific customer in response to the notification from the check-out terminal 40. That is, the processor 11 excludes, from the purchased commodities, a commodity designated by the shopper as not being a purchased commodity. The processor 11 adds, to the purchased commodities associated with the member code of the shopper, a commodity designated by the shopper out of the commodities unknown about by which shopper the commodities are taken out from the selling space. The processor 11 executes the information processing based on the sales management application P1 in this way, whereby the computer including the processor 11 as the central part functions as a registering section that performs such commodity registration.

In Act 13, the processor 11 updates the unknown list. If there is a commodity set as a purchased commodity among stray commodities, the processor 11 updates the stray commodity table D2 to exclude the commodity from the stray commodities.

Thereafter, the process proceeds to Act 14. If the combination in Act 28 of the sub-management processing is not carried out concerning the commodity list for the specific customer, the processor 11 determines No in Act 7, passes Act 8 to Act 13, and the process proceeds to Act 14. If the change of the purchased commodities is not instructed, the processor 11 determines No in Act 11, passes Act 12 and Act 13, and the process proceeds to Act 14.

In Act 14, the processor 11 executes settlement processing for settling a price for all the purchased commodities shown in the commodity list for the specific customer. For example, the processor 11 calculates a price for all the purchased commodities shown in the commodity list for the specific customer. For example, the processor 11 requests the settlement server 300 to settle the price using credit information declared in advance for the specific customer. If completion of the settlement is notified from the settlement server 300, the process proceeds to Act 15.

In Act 15, the processor 11 notifies the specific customer that the settlement is completed. For example, the processor 11 transmits the notification to an information terminal such as a smartphone carried by the specific customer. If causing the check-out terminal 40 to display the first or second confirmation screen, the processor 11 may perform the notification in the check-out terminal 40 through display on the touch panel 41. The notification may be omitted. If the shopper accesses the sales management apparatus 10 from any information terminal via the communication network 200, the sales management apparatus 10 may cause the information terminal to display a screen showing a settlement result or the like. If the notification is not performed in the check-out terminal 40 and the combination in Act 28 is not carried out, the shopper may not perform the confirmation work in the check-out terminal 40 and can directly exit the store.

Thereafter, the processor 11 ends the main management processing.

As described above, if the sales management apparatus 10 can no longer recognize a shopper performing shopping in the store as an identified shopper identified at the time of entering the store, the sales management apparatus 10 continues the commodity registration for the unidentified shopper in association with the provisional code. If the sales management apparatus 10 can recognize that the unidentified shopper is the shopper identified at the time of entering the store, the sales management apparatus 10 adds, as a purchased commodity by the shopper specified when the shopper enters the store, a commodity registered in association with the provisional code as described above. In this way, with the sales management apparatus 10, even if the shopper present in the store cannot be completely tracked from entry into the store to the exit from the store, it is possible to perform registration of purchased commodities for the shopper. The shopper can continue the shopping even in a state in which the shopper is not recognized as the shopper specified when the shopper enters the store. With the sales management apparatus 10, the shopper shopping in the store is allowed to be unable to be recognized as the shopper specified when the shopper enters the store. Therefore, with the sales management apparatus 10, compared with when it is necessary to always precisely track the shopper, it is possible to reduce a hardware size of the sensor group 30. With the sales management apparatus 10, compared with when it is necessary to always precisely track the shopper, flexibility of disposition of the sensor group 30 is improved. With the sales management apparatus 10, compared with when it is necessary to always precisely track the shopper, flexibility of the monitoring processing is improved.

With the sales management apparatus 10, if the shopper is going to exit the store in a state in which the shopper cannot be recognized as the shopper specified when the shopper enters the store, the sales management apparatus 10 acquires the member code of the shopper again. Therefore, the sales management apparatus 10 can surely recognize the unidentified customer as the shopper specified when the shopper enters the store.

If the purchased commodities registered for the unidentified shopper are added to the purchased commodities registered for the shopper specified when the shopper enters the store, the sales management apparatus 10 causes the shopper to confirm the registered purchased commodities on the first or second confirmation screen if the shopper is going to exit the store. Therefore, if the addition of the purchased commodities is not appropriately performed because of some reason, it is possible to prevent such an inappropriate situation from being left unattended.

It is likely that a time lag occurs from when the shopper cannot be recognized as the shopper specified when the shopper enters the store until when the commodity registration associated with the provisional code for the shopper is started. If the shopper takes out a commodity from the selling space in this period, the commodity cannot be set as a purchased commodity of the shopper. It is unclear which shopper purchases the commodity. However, for a shopper unable to be recognized as a shopper previously specified when the shopper enters the shop, the sales management apparatus 10 causes the shopper to confirm, on the second confirmation screen, that the stray commodity is a purchased commodity of the shopper or not. If omission occurs in the registration of the purchased commodities in the situation described above, it is possible to cause the shopper to recognize the omission of the registration. It is possible to prevent such an inappropriate situation from being left unattended. Moreover, the sales management apparatus 10 adds the stray commodity to the purchased commodities according to an instruction by the shopper in the check-out terminal 40. Therefore, it is possible to easily solve the inappropriate situation without involvement of a store clerk or the like.

Various modified implementations of this embodiment are contemplated.

The processor 11 may acquire, via the communication interface 14, a member code that is directly transmitted to the sales management apparatus 10 from the information terminal carried by the shopper when the shopper enters and exits the store via the communication network 200.

The settlement processing may be performed based on operation of the shopper at the check-out terminal 40. In this case, the settlement processing may be executed in the check-out terminal 40. Alternatively, the check-out terminal 40 may be used as a user interface device and the settlement processing may be performed in the sales management apparatus 10. As a settlement method, any settlement method such as credit card settlement, electronic money settlement, coupon settlement, rewards point settlement, QR Code® based settlement, prepaid card settlement, debit card settlement, or digital currency settlement may be used.

A part or all of the functions performed by the processor 11 through the information processing can also be performed by hardware that executes information processing not based on a program such as a logic circuit. Each of the above-described functions can be also performed by combining hardware such as a logic circuit with software control.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of this embodiments described herein may be made without departing from the spirit of the present disclosure. The accompanying claims and their equivalents are intended to cover such forms or modifications as would fall within the scope and spirit of the present disclosure.

What is claimed is:

1. A commodity registration apparatus, comprising:
    a check-in terminal configured to obtain a customer identification code of a known shopper;
    a sensor group configured to detect movement of shoppers and items in a store space; and
    a management terminal connected to the check-in terminal and the sensor group by a network and including a processor configured to:
    track movement of the known shopper based on output of the sensor group;
    track movement of items from a sales location based on output of the sensor group;
    update a first commodity list to include a commodity code for a first item when tracked movements of the known shopper and the first item indicate the known shopper has selected the first item for purchase, the first commodity list being associated with the customer identification code of the known shopper;
    track movement of an unidentified shopper based on output of the sensor group, the unidentified shopper being a customer not presently associated with a customer identification code;
    update a second commodity list to include a commodity code for a second item when tracked movements of the unidentified shopper and the second item indicate the unidentified shopper has selected the second item for purchase, the second commodity list being associated with a provisional identification code for the unidentified shopper;

generate commodity registration data for settlement processing for the known shopper using the first commodity list unless the unidentified shopper is identified as the known shopper prior to settlement processing, in which case, commodity registration data for settlement processing is generated using the first and second commodity lists in combination;

identify a time period between when the movement of the known shopper was last tracked until the movement of the unidentified shopper was first tracked; and if the unidentified shopper has subsequently been identified as the known shopper, transmit a commodity code for any stray commodity moved and not returned during the time period to a checkout terminal at which the known shopper is detected.

2. The commodity registration apparatus according to claim 1, wherein the unidentified shopper is identified as the known shopper by facial recognition analysis on an image of the unidentified shopper.

3. The commodity registration apparatus according to claim 1, wherein the unidentified shopper is identified as the known shopper when the unidentified shopper inputs a customer code at a checkout terminal for settlement processing.

4. The commodity registration apparatus according to claim 1, wherein the checkout terminal is configured to present a commodity confirmation list including the commodity code of the stray commodity.

5. The commodity registration apparatus according to claim 1, wherein the processor is further configured to:
maintain a stray commodity list including a commodity code of any stray commodity in association with a time at which the stray commodity was last tracked; and
update the stray commodity list by removing the commodity code of any stray commodity purchased by the known shopper at the checkout terminal.

6. The commodity registration apparatus according to claim 1, wherein the sensor group is a plurality of cameras.

7. The commodity registration apparatus according to claim 1, further comprising:
a checkout terminal for settlement processing.

8. The commodity registration apparatus according to claim 7, wherein the checkout terminal displays a commodity confirmation screen including the generated commodity registration data.

9. The commodity registration apparatus according to claim 1, wherein the check-in terminal comprises a bar code reader.

10. A commodity registration method, comprising:
obtaining a customer identification code of a known shopper at a check-in terminal;
tracking movement of shoppers and items in a store space based on output of a sensor group;
updating a first commodity list to include a commodity code for a first item when tracked movements of the known shopper and the first item indicate the known shopper has selected the first item for purchase, the first commodity list being associated with the customer identification code of the known shopper;
updating a second commodity list to include a commodity code for a second item when tracked movements of an unidentified shopper and the second item indicate the unidentified shopper has selected the second item for purchase, the unidentified shopper being a customer not presently associated with a customer identification code, the second commodity list being associated with a provisional identification code for the unidentified shopper;
generating commodity registration data for settlement processing for the known shopper using the first commodity list unless the unidentified shopper is identified as the known shopper prior to settlement processing, in which case, commodity registration data for settlement processing is generated using the first and second commodity lists in combination;
identifying a time period between when the movement of the known shopper was last tracked until the movement of the unidentified shopper was first tracked; and
if the unidentified shopper has subsequently been identified as the known shopper, transmitting a commodity code for any stray commodity moved and not returned during the time period to a checkout terminal at which the known shopper is detected.

11. The commodity registration method according to claim 10, wherein the unidentified shopper is identified as the known shopper by facial recognition analysis on an image of the unidentified shopper.

12. The commodity registration method according to claim 10, wherein the unidentified shopper is identified as the known shopper when the unidentified shopper inputs a customer code at a checkout terminal for settlement processing.

13. The commodity registration method according to claim 10, further comprising:
presenting a commodity confirmation list including the commodity code of the stray commodity on a display connected to the check-out terminal.

14. The commodity registration method according to claim 13, updating the commodity registration data to include the commodity code of the stray commodity if the commodity code of the stray commodity is selected on from the commodity confirmation list.

15. The commodity registration method according to claim 10, further comprising:
maintaining a stray commodity list including a commodity code of any stray commodity in association with a time at which the stray commodity was last tracked; and
updating the stray commodity list by removing the commodity code of any stray commodity purchased by the known shopper at the checkout terminal.

16. The commodity registration method according to claim 10, further comprising:
performing settlement processing using the generated commodity registration data.

17. The commodity registration method according to claim 10, wherein the sensor group comprises a plurality of cameras.

18. The commodity registration method according to claim 10, wherein the customer identification code is obtained by a bar code reader.

* * * * *